Dec. 1, 1925.  
J. M. OWEN  
OIL WELL CEMENTING  
Filed April 2, 1924  
1,563,520
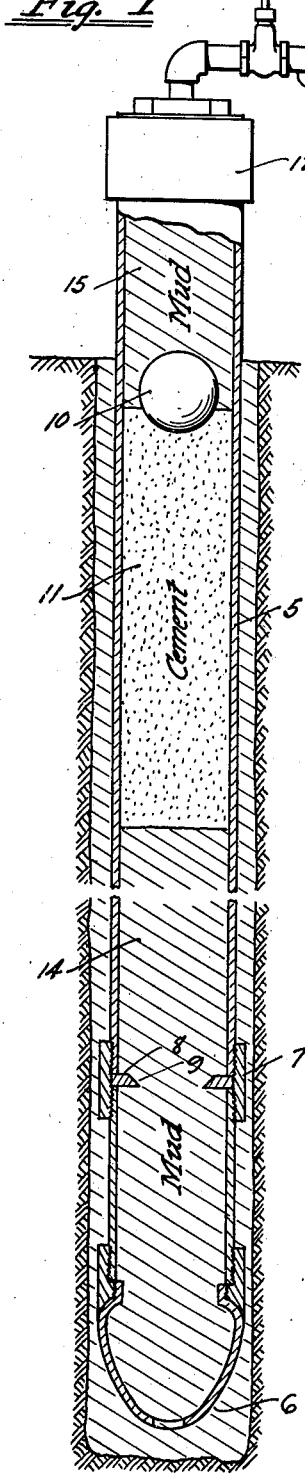
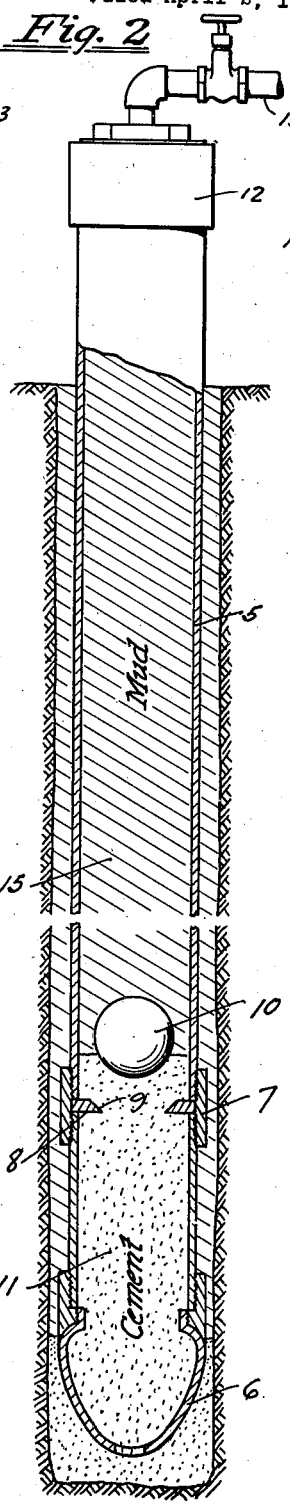
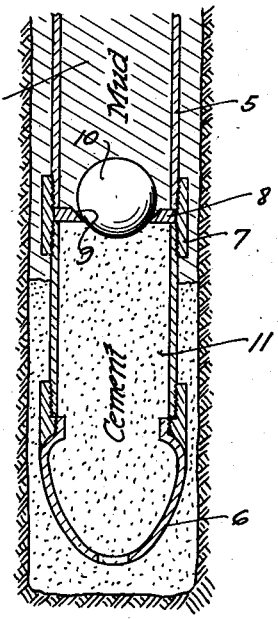
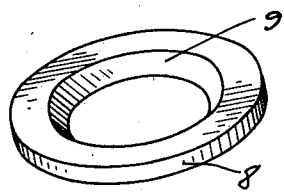
INVENTOR.  
Jack M. Owen  
BY Westall and Wallace  
ATTORNEYS Patented Dec. 1, 1925.

1,563,520

UNITED STATES PATENT OFFICE.

JACK M. OWEN, OF LONG BEACH, CALIFORNIA.

OIL-WELL CEMENTING.

Application filed April 2, 1924. Serial No. 703,724.

*To all whom it may concern:*

Be it known that I, JACK M. OWEN, a citizen of the United States, and resident of Long Beach, in the county of Los Angeles, State of California, have invented new and useful Improvements in Oil-Well Cementing, of which the following is a specification.

This invention relates to a method and means for cementing oil wells, wherein cement is forced down through a casing around the bottom thereof and upwardly outside of the casing, where it is held to form a bond or seal for purposes well known in the oil well art. This method is known as the casing method.

In the cementing of oil wells by the casing method, cement is placed in the casing and forced downwardly, it being desirable to force substantially all of the cement out of the bottom of the casing, but to allow a limited amount to remain therein. Some means or method must be employed to indicate the position of the cement. The exact position of the cement can be determined by the measurement of the liquid pumped in behind the cement to advance it, or by the provision of indicators, such as plugs. Plugs have been employed which slidingly fit the casing, however, dents or obstructions in the casing may arrest the progress of the plug. The primary object of this invention is to provide an indicator which is buoyant with respect to cement and sinks in the liquid pumped in behind the cement, has a relatively large clearance between itself and the casing so that it does not act as a barrier and which will effectively stall the pump or cause it to labor, when the desired position of the level of the cement has been reached within the casing.

These objects together with other objects and corresponding accomplishments are obtained by means of the embodiment of my invention illustrated in the accompanying drawing, in which:

Fig. 1 is a vertical section through a well hole with the casing therein and equipment installed ready for placing of the cement; Fig. 2 is a view similar to Fig. 1 showing the cement in position with the indicator about to seat and obstruct further flow of the cement; Fig. 3 is a view similar to Fig. 2 of a fragment of the whole showing the indicator in position upon its seat; and Fig. 4 is a perspective view showing the indicator seat.

Referring more particularly to the drawing, 5 indicates the usual casing with a guide shoe 6 at the bottom thereof. At the bottom collar 7, an indicator seat 8 is installed. This seat consists of a disk of sufficient diameter to be clamped between the sections of casing and having a port formed with a bevelled edge 9 so as to form a restricted bore. The seat is such that when the ball indicator 10 rests thereon, it will shut off the flow of liquid to the lower part thereof. The indicator 10 is a float indicator being of such density that it will float upon the cement indicated by 11. A tight head is indicated by 12 and circulation piping 13 is secured thereto for pumping liquid such as mud behind the cement.

The well is cemented in the following manner: Seat 8 is placed in position, the casing being filled with mud 14, as is the common practice, circulation having been established. The desired quantity of cement 11 is then placed in the casing upon the top of the mud 14. The indicator 10 is then inserted and floats on top of the cement. Next the tight head 12 is placed upon top of the casing and mud indicated by 15 is pumped into the casing forcing the cement ahead of it. The preliminary condition is shown in Fig. 1. Pumping of the mud into the casing is continued, the indicator moving downwardly upon the top of the cement and approaching the seat 8 as shown in Fig. 2. Finally, the indicator reaches the seat as shown in Fig. 3 and shuts off the mud, stalling the pump, whereupon the valve in the tight head is closed and the cement held in position under fluid pressure until it hardens. After the cement has set, the tight head is removed and the cement at the bottom drilled out.

What I claim is:

1. The method of cementing wells having casing which consists in restricting the bore of the casing adjacent the bottom, introducing cement into the casing, floating upon said cement an indicator buoyant to cement and non-buoyant to the circulation liquid and of such demensions as to lodge in the restricted bore, and introducing circulation fluid into the casing behind the cement until the indicator lodges in said bore.

2. In combination with a well casing, a seat adjacent the bottom of said casing having a restricted bore, an indicator for said casing arranged to rest thereon, said indicator being of such size as to provide clearance between it and the casing and of such density as to float upon cement and sink in circulation liquid.

3. In combination with a well casing, a seat disk having a restricted port, a ball indicator for said seat, said indicator being of such size as to provide clearance between it and the casing and of such density as to float upon cement and sink in circulation liquid.

4. In the process of cementing off pervious strata in wells in which cement grout is forced downwardly through and behind the casing and there allowed to set and harden, the improvement which comprises placing upon the cement grout in the casing, a float which is freely carried in the casing without entirely filling the cross section thereof, and then forcing the float and grout downwardly in the casing until the said float closes the lower part of the casing.

5. In the process of cementing off pervious strata in wells in which cement grout is forced downwardly through and behind the casing and there allowed to set and harden, the improvement which comprises stopping the flow of cement grout from the casing, by a float of a specific gravity slightly lower than that of the cement grout but substantially greater than that of water, such float adapted to act as a valve plug.

6. A float, adapted for use in an oil well casing, such float being of a size insufficient to completely fill the cross section of the casing, and being capable of acting as a valve plug to stop the flow when practically all of the grout is forced out of the casing, and being of a specific gravity only slightly less than that of cement grout commonly used in cementing oil wells, and substantially greater than that of water.

7. A well casing and a freely movable float therein of a slightly lower specific gravity than that of cement grout commonly used for cementing oil wells.

8. In the process of cementing off pervious strata in wells in which cement grout is forced downwardly through and behind the casing and there allowed to set and harden, the improvement which comprises placing upon the cement grout in the casing, a float which is freely carried in the casing without entirely filling the cross section thereof, and then forcing the float and grout downwardly in the casing until the said float closes the lower part of the casing, the float being of a slightly lower specific gravity than the cement grout but of a substantially higher specific gravity than inert fluids commonly used for forcing the grout into place.

9. A method of cementing off a porous stratum encountered in the boring of a well, after circulation has been established therein, which comprises forcing thin fluid cement grout into the casing in amount sufficient to form a shut-off, then introducing a float into the casing, which float does not entirely fill the cross section of the casing, and which float is of slightly lower specific gravity than said fluid cement grout, then forcing an inert liquid into the casing above said float, such inert liquid being of a lower specific gravity than said float, thereby driving the cement grout and the float downwardly until the float seats itself in the lower part of the casing.

10. A method of cementing wells which comprises forcing cement grout down through the regular well casing by means of hydraulic pressure of an inert liquid introduced above the cement grout in said casing, and in contact therewith, thereby forcing the cement grout up outside the casing, stopping the outflow of grout from the casing to the space around the same, by a float resting in the upper part of the body of cement grout, whereby none of the inert liquid stratum above the cement grout in the casing is forced through the cement grout outside the casing, and holding the cement grout in position outside of the casing and within the well, until the cement has sufficiently set and hardened.

11. The process of cementing oil wells which consist in providing a baffle device having a valve seat and an aperture below the valve seat in the lower portion of a well casing, supplying cement and fluid to the casing above said baffle device, and providing in the upper portion of the casing a valve device adapted to sink through the fluid and move downwardly on and with the cement to a position in the valve seat, and also adapted when in said seat to bring about an increase of pressure in the casing above the baffle device, whereby said increased pressure may be utilized to indicate that all or practically all of the cement is below the valve seat.

In witness that I claim the foregoing I have hereunto subscribed my name this 27th day of March, 1924.

JACK M. OWEN.